(12) United States Patent
Bhatt et al.

(10) Patent No.: US 8,337,610 B2
(45) Date of Patent: Dec. 25, 2012

(54) DISPERSION OF NEAR INFRARED ABSORBING PIGMENTS AND METHOD OF MAKING THE SAME

(75) Inventors: Jayprakash Bhatt, Corvallis, OR (US); Hichang Yoon, Corvallis, OR (US); Vladek Kasperchik, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/387,185

(22) PCT Filed: Sep. 30, 2009

(86) PCT No.: PCT/US2009/059115
§ 371 (c)(1),
(2), (4) Date: Jan. 26, 2012

(87) PCT Pub. No.: WO2011/040920
PCT Pub. Date: Apr. 7, 2011

(65) Prior Publication Data
US 2012/0174821 A1    Jul. 12, 2012

(51) Int. Cl.
*C09B 67/16* (2006.01)
*C09B 67/20* (2006.01)
*C09B 67/04* (2006.01)

(52) U.S. Cl. .............. 106/413; 106/31.77; 106/410; 106/412

(58) Field of Classification Search .......... 106/410, 106/412, 413, 493, 498, 31.77
See application file for complete search history.

(56) References Cited

U.S. PATENT DOCUMENTS

| 5,512,095 A | * | 4/1996 | Sens et al. .............. 106/412 |
| 2007/0299257 A1 | | 12/2007 | Vonwiller et al. |

FOREIGN PATENT DOCUMENTS

| EP | 1335000 | 8/2003 |
| JP | 2000/290577 | 10/2000 |
| JP | 2007/262163 | 10/2007 |

OTHER PUBLICATIONS

International Search Report and Written Opinion for PCT/US2009/059115 dated May 31, 2010 (12 pages).

* cited by examiner

*Primary Examiner* — Anthony J Green

(57) ABSTRACT

A pigment dispersion containing milled particles of near infrared (NIR) absorbing pigment and an anionic surfactant of asymmetric structure as dispersant for the pigment, and a milling method for making the same are disclosed.

14 Claims, 4 Drawing Sheets

DISPERSION OF NEAR INFRARED ABSORBING PIGMENTS AND METHOD OF MAKING THE SAME

BACKGROUND

Near infrared (NIR) absorbing compounds have useful applications in digital imaging. These compounds absorb near infrared radiation but have minimal absorption in the visible spectrum, thus, they are virtually transparent to the naked eye. Near IR radiation is commonly defined as radiation with a wavelength between 700 nm and 1,400 nm. Known NIR absorbing compounds include carbon black, inorganic pigments, metals, organic dyes, and organic pigments. To be highly useful in many applications, NIR absorbing compounds must have certain properties in addition to absorption at the desired wavelength.

The present disclosure generally relates to a dispersion of near infrared (NIR) absorbing pigments that is useful as invisible tracers in ink and coating compositions, and a method of manufacturing such dispersion. The novel aspects and advantages of the present disclosure will become apparent from the following discussion.

DETAILED DESCRIPTION

Figure 1:
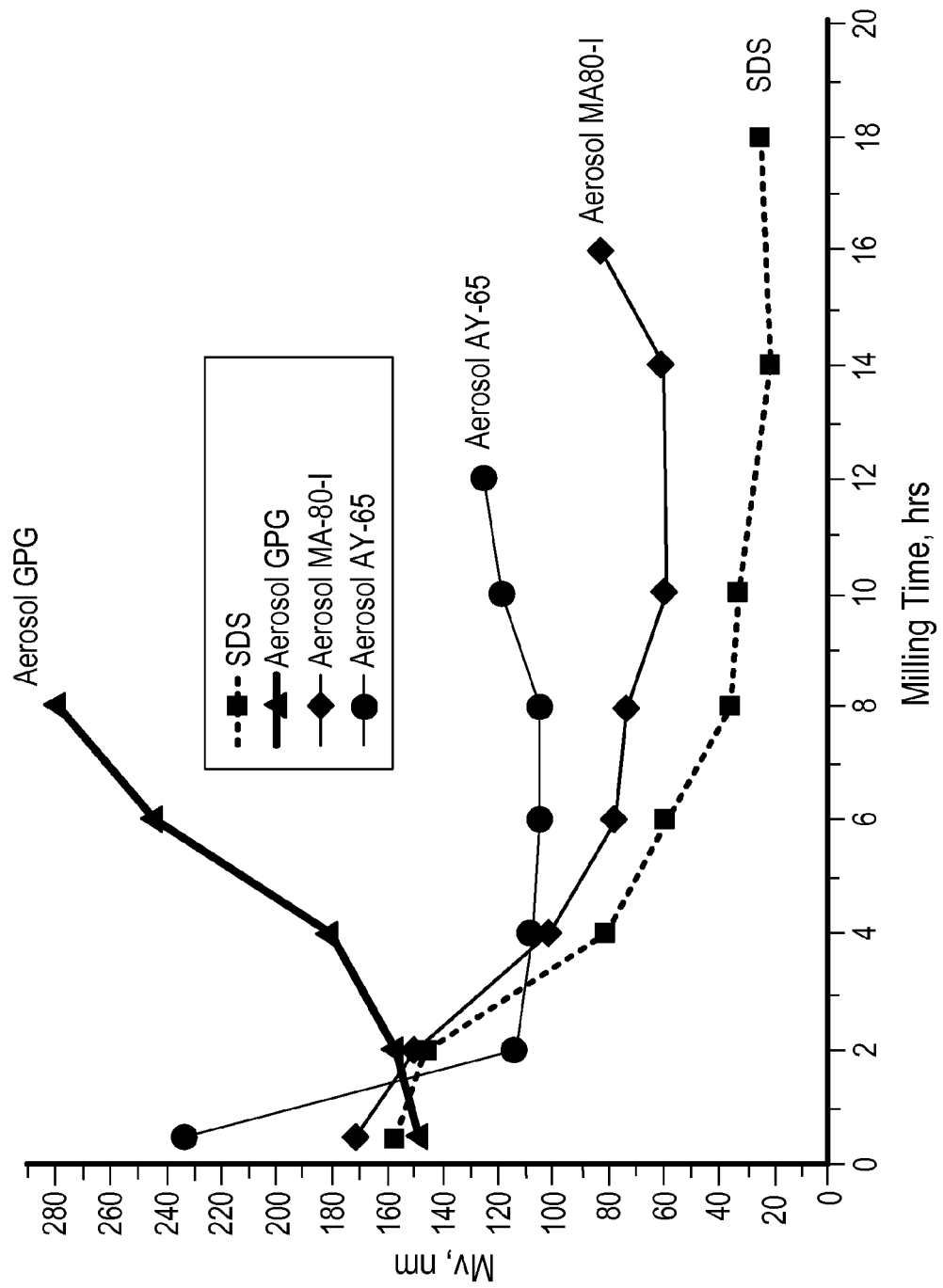
FIG. 1 shows the effect of milling naphthalocyanine pigment using anionic surfactants of symmetric structure as compared to anionic surfactants of asymmetric structure.

The addition of NIR absorbing compounds (or absorbers) into inks results in inks having NIR detectability. Thus, the NIR absorbers function as NIR tracers, which are detectable by a NIR light emitting diode (LED) sensing system. The choices of commercially available NIR absorbers are very limited. The majority of commercially available NIR absorbers are represented by two major classes of NIR compounds: (i) cyanine dyes and (ii) naphthalocyanine dyes and pigments. Some commercially available cyanine NIR dyes are water-soluble but they tend to degrade rapidly in aqueous inkjet inks. Naphthalocyanine NIR dyes and pigments provide good stability, but are scarcely available and have poor solubility. The least expensive and most stable compounds are simple, non-substituted Napthalocyanine pigment. Unfortunately, these compounds are virtually insoluble in water and most solvents.

To be highly useful as invisible additives in ink formulations for digital printing, the NIR absorbing pigments should provide strong near IR absorbance even at very low level concentration, e.g. as low as 0.001% by weight, in the ink formulation. In addition, the NIR absorbing pigments should have long-term chemical stability in the ink environment, i.e., they do not lose their strong near IR absorbance property in aqueous inkjet inks over the life of the ink, which is typically 1-4 years. This stability property is desirable for applications that require printing inks with long shelf life, such as inkjet inks. The present disclosure provides a novel aqueous dispersion of NIR absorbing pigments that meet these requirements, and an efficient method for converting commercially available NIR absorbing pigments into such dispersion. More specifically, the novel dispersion includes milled pigment particles of Naphthalocyanine with particle size of 160 nm or less, an anionic dispersant of asymmetric structure, and water.

The NIR absorbing pigments (hereafter referred to as "NIR pigments") that are useful for the purpose of the present disclosure belong to the non-substituted Naphthalocyanine class and is represented by Formula 1:

Formula 1

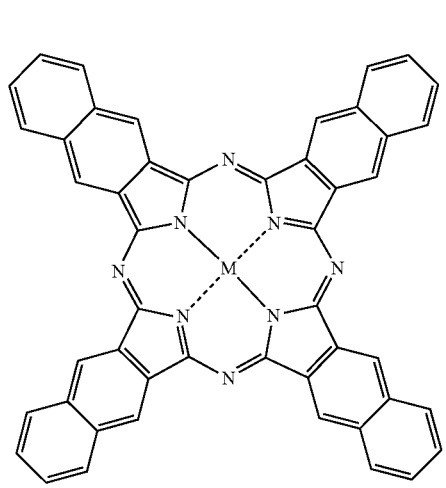

wherein M is a divalent metallic atom, a trivalent or a tetravalent substituted metal or oxymetal. The structure of Formula 1 has no side chains attached to the polycyclic porphyrine structure. Examples of a divalent metal represented by M include Cu(II), Zn(II), Fe(II), Co(II), Ni(II), Ru(II), Rh(II), Pd(II), Pt(II), Mg(II), Ti(II), Be(II), Ca(II), Ba(II), Cd(II), Hg(II), Pb(II), and Sn(II). Examples of substituted trivalent metal represented by M include Al—Cl, AlBr, Al—F, Al—I, Ga—Cl, Ga—F, Ga—I, Ga—Br, In—Cl, In—Br, In—I, In—F, Tl—Cl, Tl—Br, Tl—I, Tl—F, Al—$C_6H_5$, Al—$C_6H_4$($CH_3$), In—$C_6H_5$, In—$C_6H_4$($CH_3$), Mn(OH), Mn(O$C_6H_5$), Mn[OSi($CH_3$)$_3$]. Examples of substituted tetravalent metal represented by M include $CrCl_2$, $SiCl_2$, $SiBr_2$, $SiF_2$, $SiI_2$, $ZrCl_2$, $GeCl_2$, $GeBr_2$, $GeI_2$, $GeF_2$, $SnCl_2$, $SnBr_2$, $SnF_2$, $TiCl_2$, $TiBr_2$, $TiF_2$, $Si(OH)_2$, $Ge(OH)_2$, $Zr(OH)_2$, $Mn(OH)_2$, $Sn(OH)_2$, $TiR_2$, $CrR_2$, $SiR_2$, $SnR_2$, $GeR_2$ (wherein R is an alkyl group, phenyl group, naphthyl group or derivative thereof), $Si(OR')_2$, $Sn(OR')_2$, $Ge(OR')_2$, $Ti(OR')_2$, $Cr(OR')_2$ (wherein R' is an alkyl group, phenyl group, naphthyl group, trialkylsilyl or dialkylalkoxysilyl group or derivative thereof), Sn(SR")2 and Ge(SR")2 (wherein R" is an alkyl group, phenyl group, naphthyl group or derivative thereof). Examples of oxymetals represented by M include VO, MnO and TiO.

The NIR pigments discussed above absorb light in the wavelength range of about 700 to 1400 nm. Thus, they are virtually transparent to visible light in liquid ink compositions, particularly when present at a low concentration, e.g. less than 5 wt %. In addition, these NIR pigments are chemically and thermally stable as additives in inkjet inks, however, they are insoluble in water and most solvents commonly used in inkjet inks. As examples, suitable Naphthalocyanine pigments include, but not limited to, YKR1031, YKR3072, HR181, YKR3071, N700EX, YKR-4010, YKR-3030, YKR-3070, MIR-379, MIR-369, YKR-3040, YKR-5010, YKR-3081, MIR-362, and YKR-3080, available from Yamamoto Chemicals Co.

Raw naphthalocyanine pigments typically exist in the form of dry sub-micron particles or flakes, which are not suitable for inkjet inks because they are too large and have poor dispersibility due to their tendency to aggregate into clumps.

effective dispersants are found to be anionic surfactants of asymmetric structure. These dispersants are characterized by having a long, flexible alkyl chain (hydrophobic portion), or alkyl chain connected to moderately hydrophilic poly(ethylene oxide) (PEO) chain, and one or more hydrophilic anionic groups (head groups) directly attached to the flexible part of the structure (the alkyl chain, or the alkyl plus PEO chain). Examples of suitable anionic surfactants are those represented by the following formulas:

Formula 2

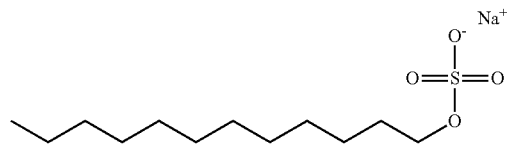

Formula 3

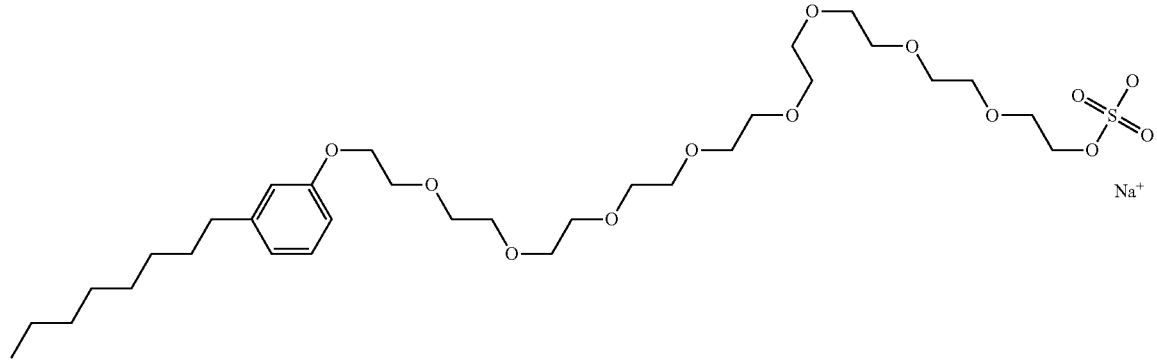

Formula 4

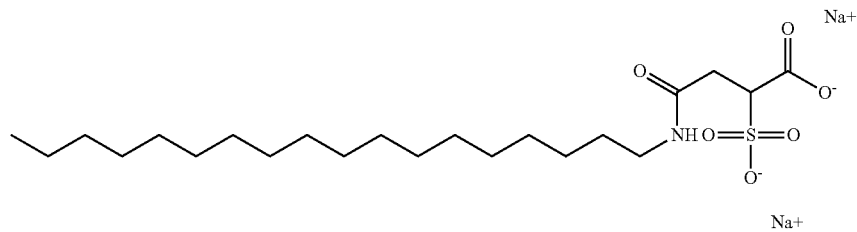

Formula 5

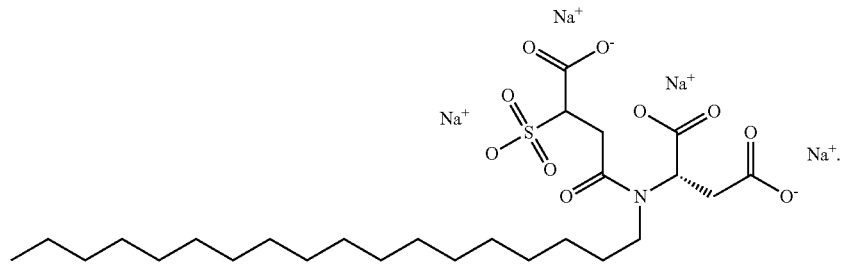

In accordance with one aspect of the present disclosure, raw naphthalocyanine pigments are processed via milling to form a liquid dispersion of fine pigment particles having particle sizes in the 10-200 nm range. This milling process is enhanced by the use of specific dispersants for the naphthalocyanine pigments. It has been found that the most efficient milling process is contingent upon the right choice of dispersant and that not all dispersants work equally well. The most An example of a surfactant represented by Formula 2 is sodium dodecyl sulfate (SDS). Aerosol 18 (disodium N-octadecyl sulfosuccinamate) is an example of a surfactant having the structure of Formula 3, and Aerosol 22 (tetrasodium N-(1,2-dicarboxyethyl)-N-octadecyl sulfosuccinamate) is an example of a surfactant having the structure of Formula 4, both available from Cytec Industries. The structure of Formula 5 contains both an anionic, hydrophilic group at the end of the flexible alkyl chain as well as a non-inonic, flexible hydrophilic chain positioned between anionic head group and hydrophobic part of the molecule. Aerosol NPES-458 (ammonium salt of sulfated nonylphenoxypoly(ethyleneoxy) ethanol) available from Cytec Industries is an example of a surfactant having the structure of Formula 5.

Milling with a high content of the above anionic dispersants can yield stable dispersions of fine pigment particles having particle size of less than 100 nm, and as low as 10 nm. By contrast, milling with other structurally different dispersants—anionic surfactants with symmetric structure (e.g. diester sulfosuccinates), nonionic surfactants (e.g. octyl phenyl ethoxylate), anionic surfactants with hydrophilic group attached directly to the rigid part of the molecular structure (e.g. sodium dodecylbenzosulfonate)—fails to produce stable dispersions with particle size less than 200 nm over time, and instead, results in flocculation and dispersion gelling.

In addition to the choice of dispersant, it has been found that certain bead milling equipment produces the desired nano particle size (less than 200 nm) as compared to other conventional milling equipments such as roll mills, ball mills and vibration mills. These conventional milling equipments can only produce dispersions with particle size in the range of 200-500 nm. The preferred bead milling equipment is a wet grinding machine capable of using very fine beads having diameter of less than 1.0 mm, preferably 0.1 mm or less, as the grinding medium, for example, Ultra-Apex Bead Mill from Kotobuki Industries Co. Ltd.

The method for forming the novel dispersion of NIR pigment according to the present disclosure starts with mixing raw naphthalocyanine with the preferred dispersant (i.e., the anionic surfactant discussed above) and water to form a starting dispersion containing 1-25% by weight of naphthalocyanine pigment. The weight ratio of dispersant (surfactant) to naphthalocyanine pigment is preferably in the range of 0.1 to 1.5, preferably 0.3 to 0.7. The starting dispersion is then introduced into the bead mill of the type described above and milled for a time sufficient to produce a stable dispersion with pigment particles having particle size of 160 nm or less. In preferred embodiments, milling is carried out until the naphthalocyanine pigment particles have particle size in the range of 10-160 nm. The milling duration, rotor speed and temperature may be adjusted as known to those skilled in the art to achieve the results desired. It has been discovered that as the particle size is reduced via milling to less than 160 nm, the NIR extinction coefficient (a measure of NIR absorptivity) of the naphthalocyanine pigment drops. This is an unexpected finding. Furthermore, inkjet inks conventionally contain salts, and milling to reduce the particle size also reduces the salt tolerance of the pigment dispersion. Thus, over-milling may be detrimental to the stability of the naphthalocyanine pigment. On the other hand, milled pigment particles having smaller particle size exhibit better dispersion stability (i.e., lower settling/sedimentation rate), but the milling duration is much longer and the NIR extinction may be too low for some purposes. For example, milling to achieve particle size of less than 50 nm takes more than 10 hours, but the resulting dispersion exhibits substantially no sedimentation. Accordingly, the more preferred particle size is in the range of 40-120 nm, and the most preferred range is 60-100 nm as this range provides the best compromise with regard to NIR extinction, settling rate and processing time.

The dispersion of milled NIR pigment according to the present disclosure is well suited as an additive in conventional inkjet inks, and may tolerate the presence of small amounts (up to 1-2 mMol/L) of salts such as $Mg^{2+}(NO_3)_2^{2-}$, $Li^+NO_3^-$, $K^+NO_3^-$, $Na^+CH_3SO_3^-$, $Na^+NO_3^-$, and $Mg^{2+}(CH_3SO_3)_2^{2-}$, and the like. The dispersion exhibits good salt tolerance in such salt-containing inks due in part to the choice of anionic dispersant with asymmetric structure discussed above. Furthermore, the nano-sized particles of milled NIR pigment exhibit chemical stability and good dispersibility in the liquid vehicle of the inks. When used in inkjet inks, the pigment dispersion may be added so that the concentration of NIR pigment is about 0.001% to 6.0% by weight, more preferably, 0.001% to 1.0% by weight. The lower the NIR pigment concentration, the less visible the NIR pigment particles are in the visible region.

As used herein, the term "inkjet inks" refers to an aqueous ink compositions that are suitable for inkjet printing. The pigment dispersion of the present disclosure may be incorporated into colored ink compositions (which contain visible colorants) as well as colorless ink compositions (which are void of visible colorants). The inkjet ink compositions are typically prepared in an aqueous formulation or liquid vehicle which may include water, organic solvents, surfactants, buffering agents, biocides, sequestering agents, viscosity modifiers, humectants, and/or other known additives. The "liquid vehicle" refers to the carrier or medium for carrying the colorant and/or other additives to a print medium, e.g. paper. The liquid vehicle may comprise from about 70 wt % to about 99.9 wt % by weight of the inkjet ink composition. The term "colorants" as used herein includes dyes and pigments that have maximum absorbance in the visible wavelength range of about 400 nm to 700 nm, and have negligible absorption above 700 nm, thereby providing visible color. The term "maximum or peak absorption" refers to the light wavelength where most absorption occurs. Typically, a range of absorption of at least 25 nm on either side of peak absorbance is present.

When the ink containing the milled NIR pigment, as prepared according to the present disclosure, is printed on a print medium, e.g. paper, the presence of the NIR absorbing pigment can be detected using a LED device coupled with a sensor. The NIR absorbing pigment absorbs some portion of the emitted light from the LED. The decrease in LED intensity is detected by the sensor, which then registers the presence of the NIR pigment. By adding a sufficient amount of NIR absorbing pigment into each of the color inks in an ink set, a method of detection can be provided that is independent of the ink colors. When the NIR absorbing pigment is implemented in such detection method, it has been discovered that the NIR absorbing pigment can provide consistent long-term detection.

Aside from inkjet ink compositions, the novel pigment dispersion of the present disclosure may be incorporated into coating compositions to provide low visible absorption and little color to the coating films to be formed. By having dispersed pigment particles of nano size, smooth and uniform NIR absorbing coatings are possible.

Numerical values, such as ratios, concentrations, amounts, molecular sizes, etc., may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc.

EXAMPLES

The following examples illustrate embodiments of the present disclosure that are presently best known and provide further detail in connection with what is presently deemed to be the most practical and preferred embodiments of the present disclosure. However, other embodiments may be practiced that are also within the scope of the present disclosure.

Example 1

Milling tests were carried out for milling raw naphthalocyanine (YKR-5010 available from Yamamoto Chemicals Co.) with different dispersants. The raw naphthalocyanine has pigment particle size in the range of 300 nm and 1 μm. The dispersants used were:

(a) SDS, Aerosol-18, Aerosol-22, Aerosol NPES-458, which are the preferred anionic surfactants with asymmetric structures represented by Formulas 2, 3, 4, 5 discussed above;

(b) Aerosol GPG, Aerosol MA80-1, Aerosol AY-65, which are anionic surfactants with symmetric structure represented by Formulas 6, 7, and 8, respectively;

(c) Triton X-100, which is a non-ionic surfactant with asymmetric structure represented by Formula 9;

(d) SDBS, which is an anionic surfactant with a hydrophilic anionic group attached to a rigid benzene ring as represented by Formula 10.

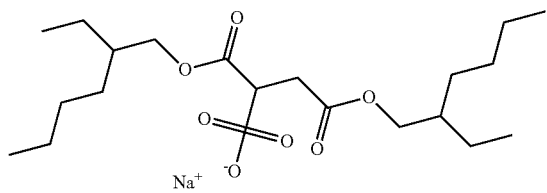

Aerosol GPG

Formula 6

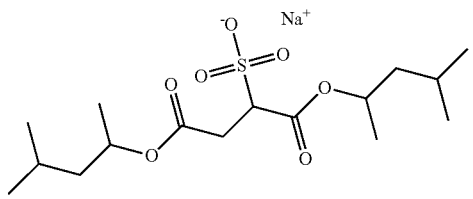

Aerosol MA80-I

Formula 7

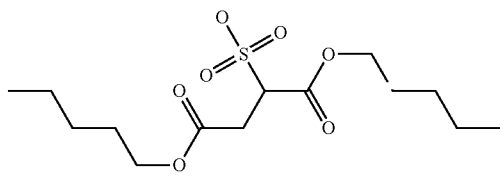

Aerosol AY-65

Formula 8

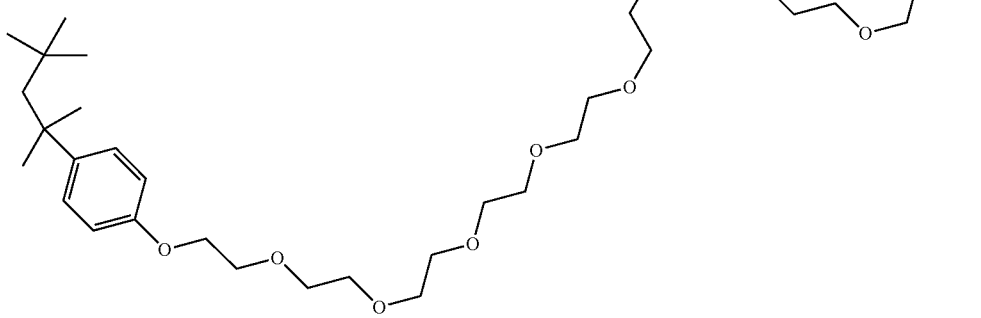

Triton X-100

Formula 9

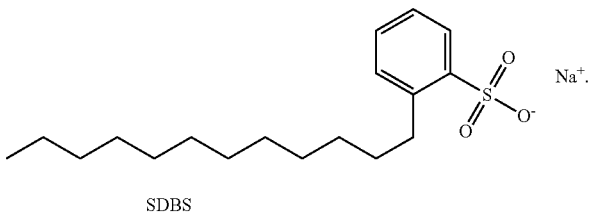

SDBS

For each milling test, a starting mixture containing raw YKR-5010, a dispersant, and water was introduced into an Ultra-Apex Bead Mill from Kotobuki Industries Co. Ltd. using YTZ (yttria zirconia oxide) beads with diameter of 0.05 mm. The weight ratio of dispersant to pigment (D/P) was 0.7 for all cases except for Triton X-100, in which case D/P was 0.35. The rotor speed was 12 m/s and the milling chamber was maintained at 10° C.

Figure 2:
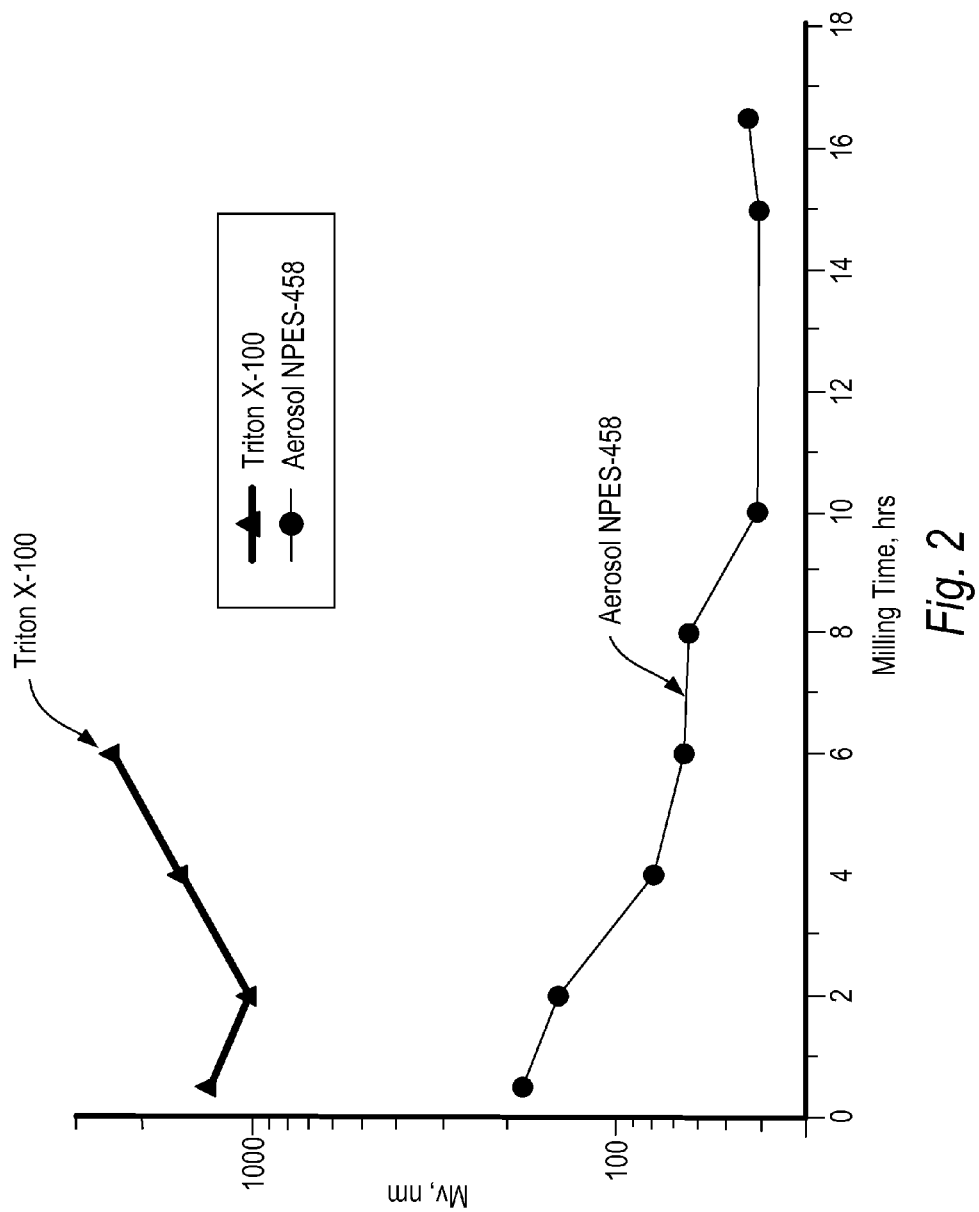
FIG. 2 shows the effect of milling naphthalocyanine pigment using a non-ionic surfactant as compared to an anionic surfactant of asymmetric structure.
Figure 3:
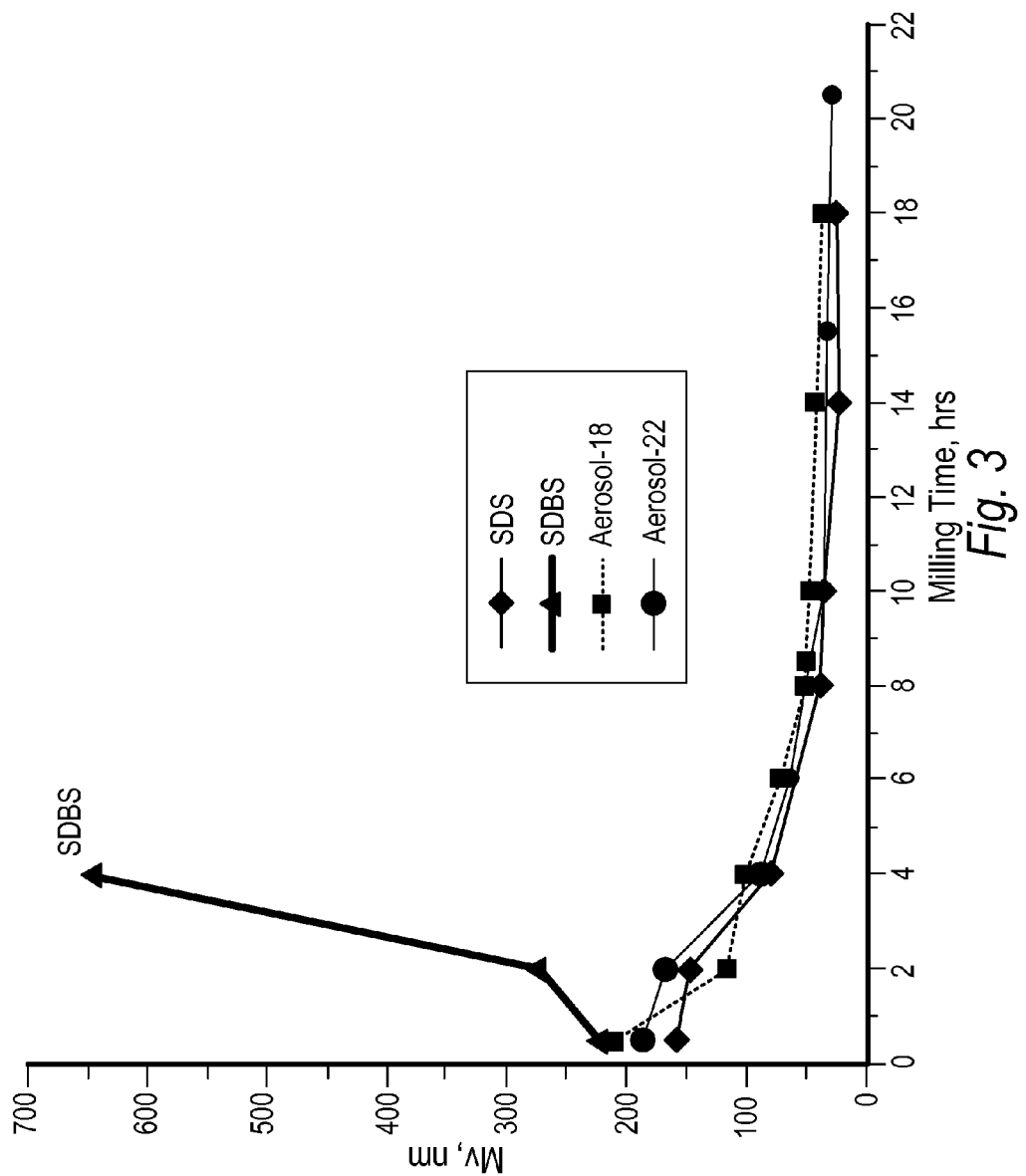
FIG. 3 shows the effect of milling naphthalocyanine pigment using different anionic surfactants of asymmetric structure.

FIGS. 1-3 show the results for the different milling tests. More specifically, the graphs in FIGS. 1-3 show the correlation between the average pigment particle size (Mv) and milling duration. In all milling tests done with SDS, Aerosol-18, Aerosol-22, Aerosol NPES-458 as dispersants, stable dispersions with particle size reduction below 100 nm were achieved. FIG. 1 shows the results for milling with Aerosol GPG, Aerosol AY-65 and Aerosol MA80-I as compared to milling with SDS. For milling tests in which YKR-5010 was milled with Aerosol AY-65 and Aerosol MA80-I, the dispersions turned into gel as the milled pigment particle size decreased to less than 100 nm. Milling with Aerosol GPG resulted in flocculation and no size reduction.

Referring to FIG. 2, milling naphthalocyanine pigment with Triton X-100 did not result in particle size reduction as compared to milling with Aerosol NPES-458. Referring to FIG. 3, milling naphthalocyanine pigment with SDBS also did not result in particle size reduction. Instead of dispersing, SDBS acted as a flocculating agent. The pigment particles became more hydrophobic over time and flocculated with foam. In contrast, milling with SDS, Aerosol-18, Aerosol-22 resulted in stable dispersions and particle size reduction down to about 20 nm.

Example 2

Figure 4:
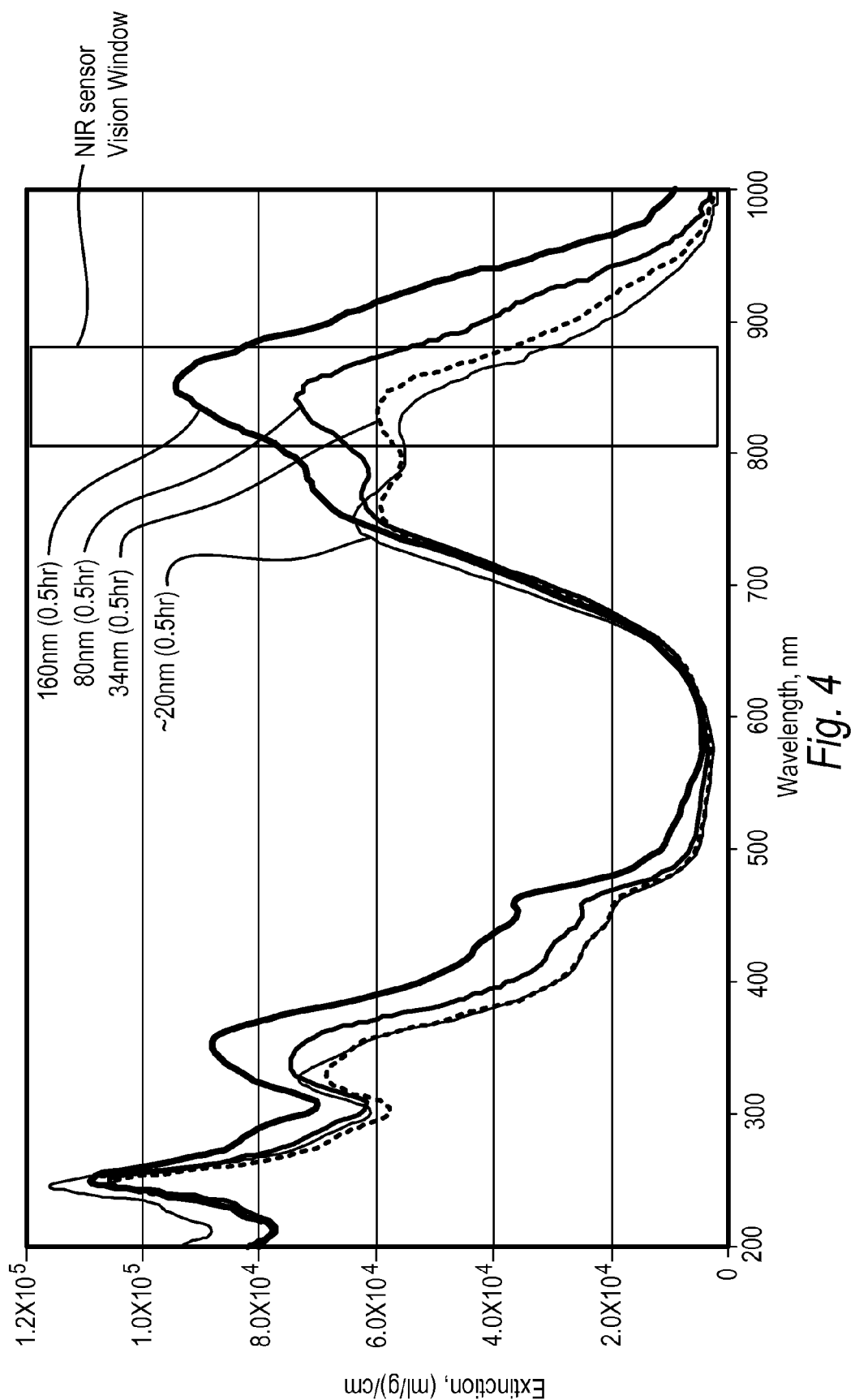
FIG. 4 shows the effect of milling time and particle size reduction on the NIR extinction coefficient of naphthalocyanine pigment during milling.

A milling test as described in Example 1 was repeated in which raw YKR-5010 was milled with SDS as dispersant at D/P ratio of 0.7. The effect of milling time and particle size reduction on the NIR extinction coefficient of dispersed naphthalocyanine was monitored using UV-Visible-NIR spectroscopy of naphthalocyanine dispersion at equal dilution and is depicted graphically in FIG. 4. FIG. 4 shows absorption spectrum of naphthalocyanine pigment dispersion with average particle size of 160 nm (after 0.5 hr), 80 nm (after 4 hrs), 34 nm (after 10 hrs), and 20 nm (after 20 hrs). As can be seen from FIG. 4, the peak absorption between 800 nm and 900 nm drops with decreased particle size.

Example 3

An inkjet ink composition was prepared according to the following formulation, by weight:
3.0 wt % milled naphthalocyanine (prepared as described in Example 1 using SDS as dispersant; D/P=0.7; average pigment particle size of about 60 nm)
9.0 wt % 2-Pyrrolidinone
5.0 wt % LEG-1 (glyceryl polyoxyethyl ether)
2.0 wt % Trizma base (organic buffer)
Water making up the balance The above ink composition was used in a commercially available inkjet printer to print out test patterns on paper. Good nozzle health (no missing nozzles) and stable jetting was observed.

Example 4

The dispersion of milled naphthalocyanine pigment with average pigment particle size of about 60 nm, prepared as described in Example 1 using SDS as dispersant, was added to a commercially available ink set containing cyan, magenta and yellow inks from Hewlett-Packard Company (cartridge #HP940). The amount of naphthalocynine pigment added to each color ink was 0.05% by weight. The color inks containing the NIR pigments were then stored at 60° C. for 12 weeks and the percentage of absorbance at 830 nm for the cyan, magenta and yellow inks containing milled NIR pigments were observed. It was observed that there was substantially no loss in absorbance at 830 nm after 12 weeks. The observed data indicates that the milled NIR pigment is highly stable in colored, inkjet ink formulations over time.

The foregoing description of various embodiments of the present disclosure has been presented for purposes of illustration and description. It is not intended to be limited to the precise form or to exemplary embodiments disclosed. Numerous modifications and alternative compositions, methods, and systems may be devised by those skilled in the art without departing from the spirit and scope of the present disclosure. The appended claims are intended to cover such modifications and arrangements.

What is claimed is:

1. A pigment dispersion comprising:
   milled particles of naphthalocyanine pigment having a particle size in the range of 10 nm to 160 nm;
   an anionic surfactant of asymmetric structure as a dispersant for the naphthalocyanine pigment; and
   water,
   wherein the naphthalocyanine pigment is a near infrared (NIR) absorbing compound that absorbs light in the wavelength range of about 700 nm to 1400 nm, and
   wherein the anionic surfactant has (i) a hydrophobic alkyl chain connected to a non-ionic poly(ethylene oxide) (PEO) chain, and (ii) at least one hydrophilic, anionic head group directly attached to the non-ionic PEO chain, and is represented by the following formula:

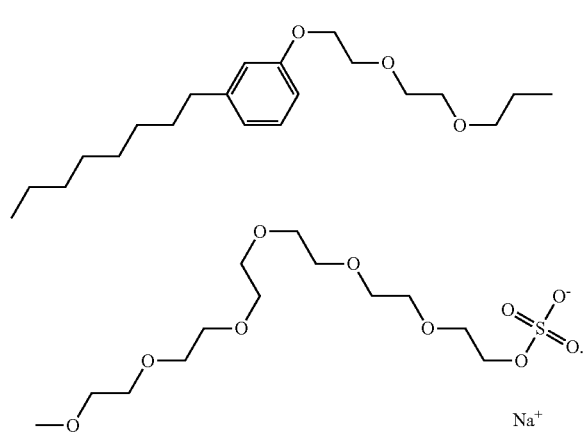

2. The pigment dispersion of claim 1, wherein a weight ratio of surfactant to pigment is 0.1 to 1.5.

3. The pigment dispersion of claim 1, wherein the milled particles have the particle size in the range of 40 nm to 120 nm.

4. The pigment dispersion of claim 1, wherein the milled particles have the particle size in the range of 60 nm to 100 nm.

5. The pigment dispersion of claim 1, wherein the naphthalocyanine pigment is non-substituted naphthalocyanine represented by the following formula

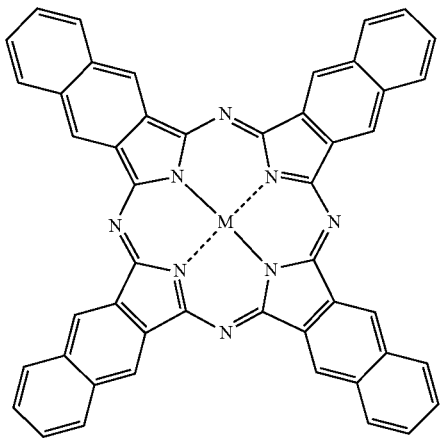

wherein M is a divalent metallic atom, a trivalent or a tetravalent substituted metal or oxymetal.

6. An inkjet ink composition with NIR detection capability comprising the pigment dispersion of claim 1 mixed with a liquid vehicle.

7. The inkjet ink composition of claim 6 wherein a concentration of the naphthalocyanine pigment in the inkjet ink composition is in the range of 0.001% to 6.0% by weight.

8. The inkjet ink composition of claim 6 wherein the inkjet ink composition is void of any dye or pigment colorant.

9. The inkjet ink composition of claim 6, further comprising a dye or pigment colorant.

10. A method of making a dispersion of milled NIR absorbing pigments comprising:

introducing raw naphthalocyanine pigment with a particle size greater than 200 nm, an anionic surfactant of asymmetric structure and water into a bead mill which contains beads having diameter of less than 1.0 mm as a grinding medium; and milling to produce a dispersion containing pigment particles having a particle size in the range of 10 nm to 160 nm, wherein the naphthalocyanine pigment is a near infrared (NIR) absorbing compound that absorbs light in the wavelength range of about 700 nm to 1400 nm, and wherein the anionic surfactant has (i) an alkyl chain or alkyl chain connected to a poly(ethylene oxide) (PEO) chain, and (ii) at least one hydrophilic, anionic head group directly attached to the alkyl chain or the PEO chain.

11. The method of claim 10, wherein said bead mill contains beads having a diameter of 0.1 mm or less as the grinding medium.

12. The method of claim 10, wherein the anionic surfactant is selected from the group consisting of surfactants with the following formulas:

Formula I

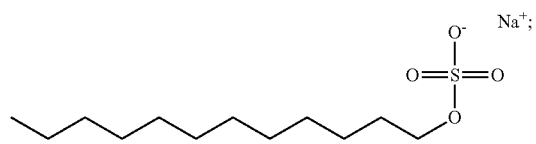

Formula II

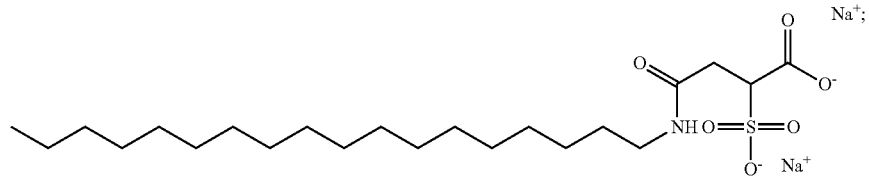

-continued
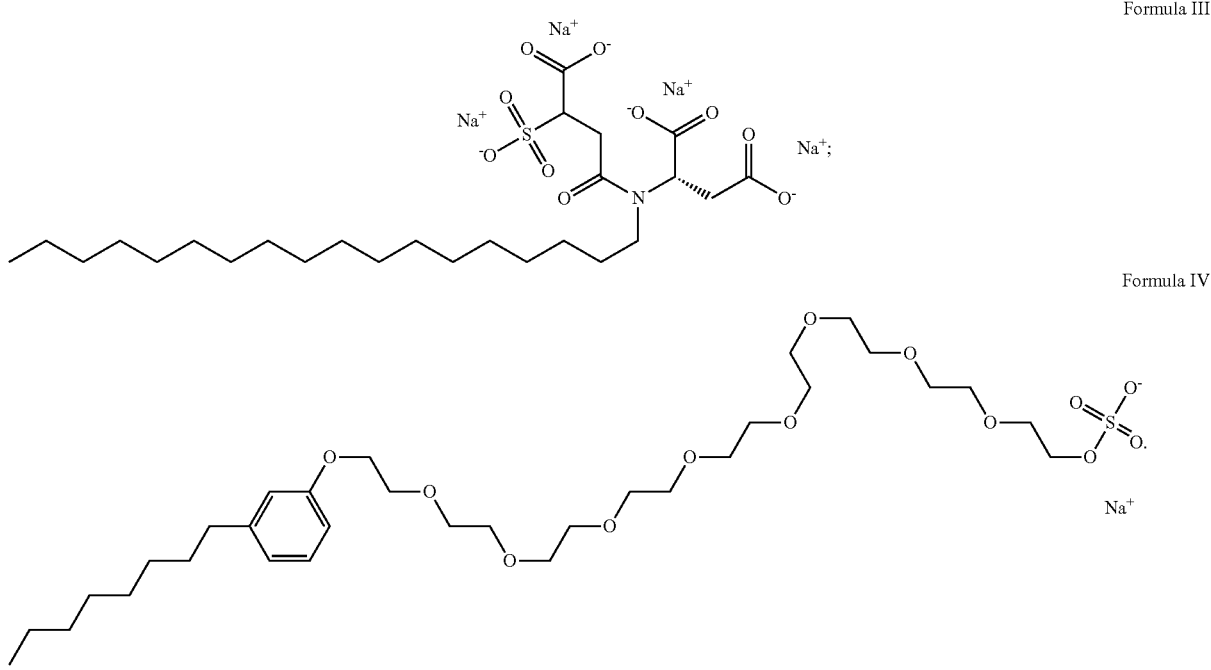
Formula III
Formula IV
13. The method of claim 10, wherein the naphthalocyanine pigment is non-substituted naphthalocyanine represented by the following formula:
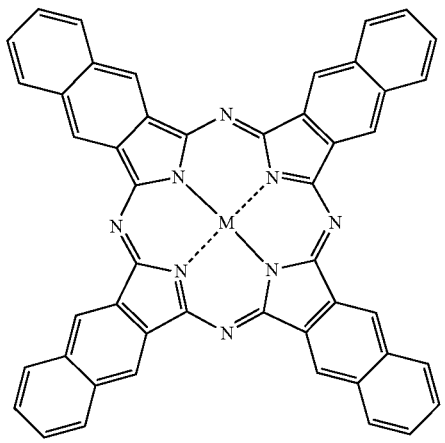
wherein M is a divalent metallic atom, a trivalent or a tetravalent substituted metal or oxymetal.
14. The method of claim 10, wherein the weight ratio of surfactant to pigment is 0.1 to 1.5.
* * * * *

UNITED STATES PATENT AND TRADEMARK OFFICE
CERTIFICATE OF CORRECTION

PATENT NO. : 8,337,610 B2
APPLICATION NO. : 13/387185
DATED : December 25, 2012
INVENTOR(S) : Jayprakash Bhatt et al.

It is certified that error appears in the above-identified patent and that said Letters Patent is hereby corrected as shown below:

In the Specification:

In columns 3-4, lines 12-59, delete

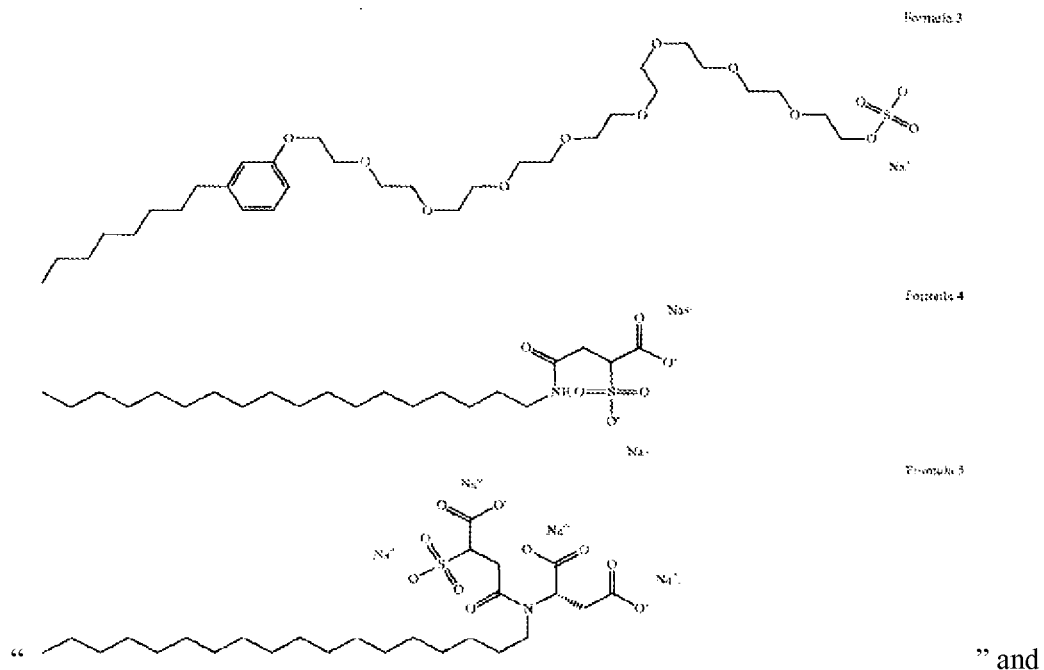

" and

Signed and Sealed this
Twenty-third Day of April, 2013

Teresa Stanek Rea
*Acting Director of the United States Patent and Trademark Office*

CERTIFICATE OF CORRECTION (continued)

U.S. Pat. No. 8,337,610 B2

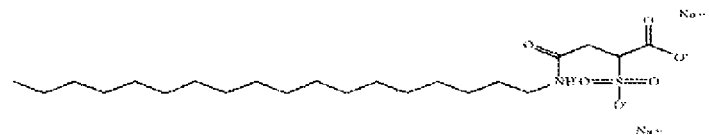

Formula 3

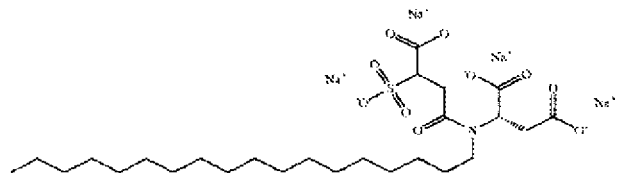

Formula 4

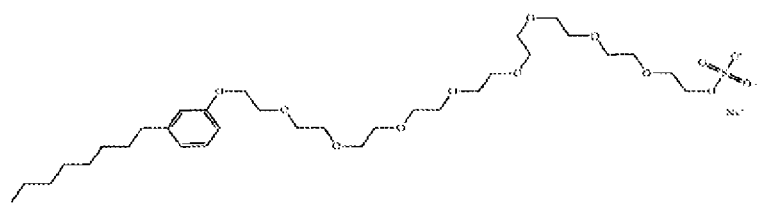

insert -- Formula 5                                                                                              --, therefor.

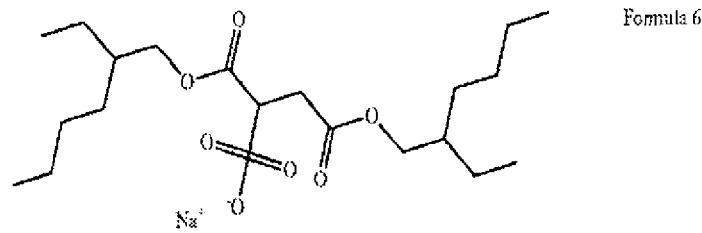

Formula 6

In Columns 7-8, line 17, delete "    Aerosol GPG                                                                "

Aerosol GPG

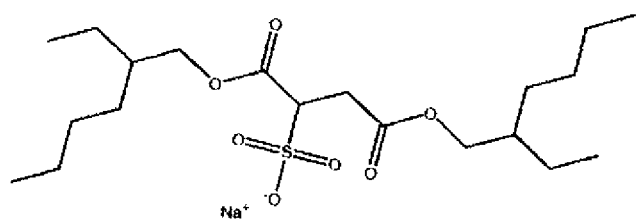

and insert -- Formula 6                                                                                          --, therefor.

CERTIFICATE OF CORRECTION (continued)
U.S. Pat. No. 8,337,610 B2

In columns 7-8, line 19, delete

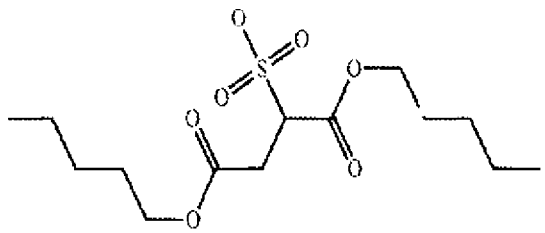

" Aerosol AY-65 " and

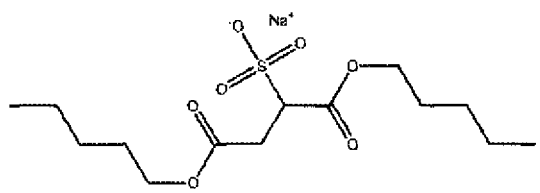

Aerosol AY-65 insert -- Formula 8 --, therefor.

In the Claims:

In column 11, lines 1-17, in Claim 1, delete

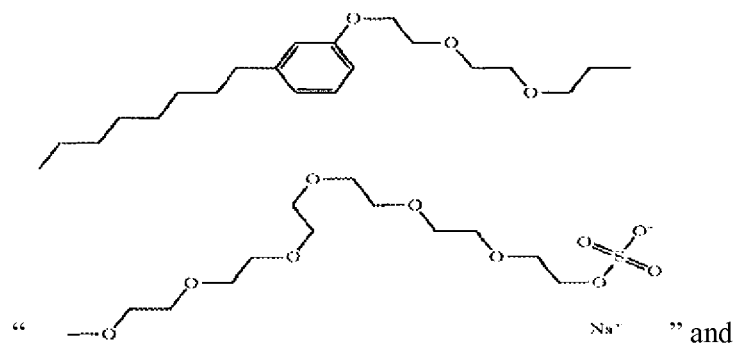

" " and

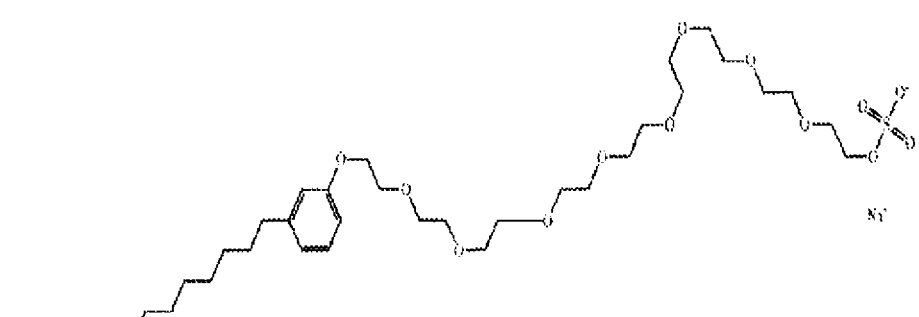

insert -- --, therefor.

CERTIFICATE OF CORRECTION (continued)
U.S. Pat. No. 8,337,610 B2

In column 11, line 29, in Claim 5, delete "formula" and insert -- formula: --, therefor.

In columns 13-14, line 2, in Claim 12, delete " 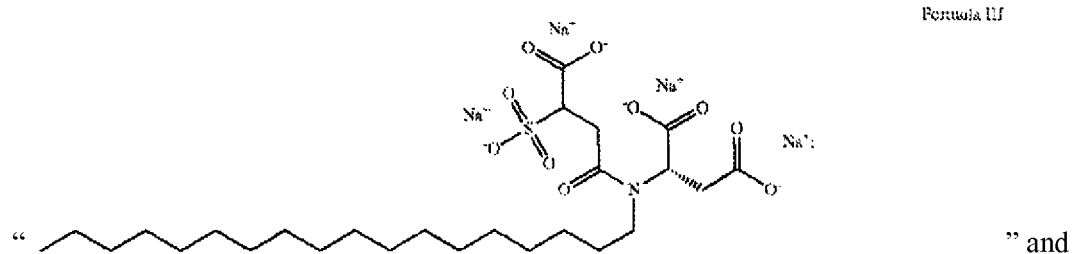 " and insert -- 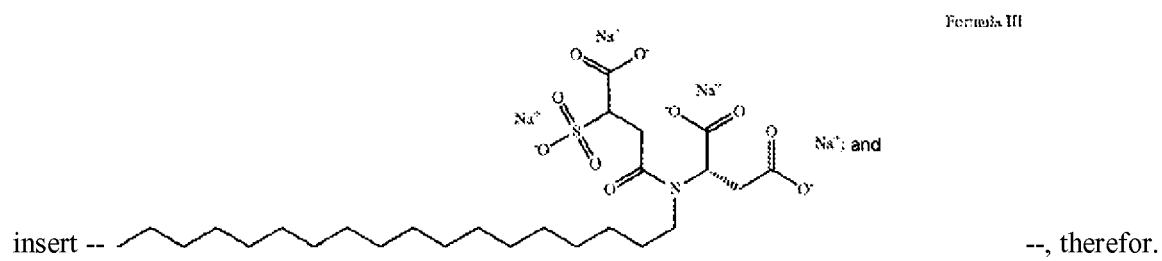 --, therefor.